United States Patent
Karim et al.

(10) Patent No.: US 7,286,340 B2
(45) Date of Patent: Oct. 23, 2007

(54) ADJUSTABLE ADAPTER FOR MOUNTING ELECTRICAL SWITCHING APPARATUS AND ENCLOSURE ASSEMBLY EMPLOYING THE SAME

(75) Inventors: Syed M. Karim, Lincoln, IL (US); James L. Gehlbach, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/299,192

(22) Filed: Dec. 9, 2005

(65) Prior Publication Data

US 2007/0133152 A1 Jun. 14, 2007

(51) Int. Cl.
*H02B 1/26* (2006.01)

(52) U.S. Cl. .................. 361/647; 361/631; 361/634; 361/645; 361/673; 361/652; 361/809; 361/825; 361/600; 361/679; 200/294; 200/50.01; 200/50.11; 200/50.2; 439/716; 403/13; 264/250; 264/259; 248/222.11; 29/557; 29/558

(58) Field of Classification Search ............... 361/647, 361/627, 605, 652, 645, 611, 634, 631, 636, 361/673, 658, 665, 622, 626, 832, 61; 385/167, 385/176; 174/66, 67, 148; 439/554, 716, 439/101, 102; 403/13, 381, 24, 387, 14; 335/6–10, 20, 200, 202
See application file for complete search history.

(56) References Cited

U.S. PATENT DOCUMENTS

| 3,398,249 | A | * | 8/1968 | Dessert | ................. 200/294 |
|---|---|---|---|---|---|
| 4,073,563 | A | | 2/1978 | Bailey et al. | |
| 4,351,620 | A | * | 9/1982 | Stritt et al. | ................ 403/13 |
| 4,472,761 | A | | 9/1984 | Koslosky et al. | |
| 4,646,199 | A | * | 2/1987 | M'Sadoques et al. | ....... 361/634 |
| 5,047,604 | A | | 9/1991 | Grass et al. | |
| 5,635,827 | A | | 6/1997 | Judd et al. | |
| 5,744,768 | A | * | 4/1998 | Bishop et al. | ........... 200/50.01 |
| 5,943,207 | A | * | 8/1999 | Kim | ........................ 361/673 |
| 6,062,914 | A | * | 5/2000 | Fasano | ...................... 439/716 |
| 6,266,232 | B1 | * | 7/2001 | Rose et al. | ................ 361/645 |
| 6,292,076 | B1 | | 9/2001 | DeGrazia et al. | |
| 6,416,702 | B1 | * | 7/2002 | Montague et al. | .......... 264/250 |
| 6,437,971 | B1 | * | 8/2002 | Rane et al. | ................ 361/673 |
| 6,563,406 | B2 | * | 5/2003 | Beatty et al. | ................. 335/16 |
| 6,680,842 | B1 | * | 1/2004 | Pelaez et al. | ............... 361/631 |
| 7,146,713 | B1 | * | 12/2006 | Ying | ....................... 29/603.16 |

* cited by examiner

*Primary Examiner*—Boris Chervinsky
*Assistant Examiner*—Courtney Smith
(74) *Attorney, Agent, or Firm*—Martin J. Moran

(57) ABSTRACT

An adapter is for mounting an electrical switching apparatus, such as a circuit breaker, on the back panel of an enclosure, such as a switchgear cabinet. The back panel has at least one aperture. The adapter includes a first end portion coupled at or about the aperture of the back panel, an engaging portion engaging and securing the circuit breaker to the adapter, a fastener, and a second end portion disposed distal from the first end portion and including an elongated slot. The elongated slot receives the fastener in order to couple the adapter to the back panel when the fastener is fastened, while enabling adjustment of the adapter and the circuit breaker coupled thereto, with respect to the back panel, when the fastener is unfastened. The first end portion, the engaging portion and the second end portion form a single piece adapter. An enclosure assembly is also disclosed.

18 Claims, 4 Drawing Sheets

ADJUSTABLE ADAPTER FOR MOUNTING ELECTRICAL SWITCHING APPARATUS AND ENCLOSURE ASSEMBLY EMPLOYING THE SAME

BACKGROUND OF THE INVENTION

1. Field of the Invention

The present invention relates generally to electrical switching apparatus and, more particularly, to adapters for mounting circuit breakers in an enclosure. The invention further relates to enclosure assemblies for mounting and positioning electrical switching apparatus.

2. Background Information

Electrical equipment (e.g., without limitation, relays; circuit breakers; meters; transformers) is often housed within an enclosure, such as, for example and without limitation, a switchgear cabinet, a panelboard, or a load center.

Such enclosures often house a plurality of electrical switching apparatus, such as, for example, circuit breakers. For example, some circuit breakers are typically disposed in parallel rows with one or more bus bars extending between the rows and interconnecting pairs of opposing circuit breakers disposed on opposite sides of the bus bar. Space is usually at a premium within the enclosure and, therefore, greatly limits the location and type of mounting of the circuit breakers. To conserve space, various circuit breakers are typically coupled either to a DIN rail or directly to the back panel of the panelboard. DIN is short for *Deutsches Insitut für Normung eV*, which is a standard-setting organization for Germany. Accordingly, a DIN rail is a connecting rail structure which is designed to satisfy DIN standards. More specifically, some manufacturers of circuit breakers provide the circuit breaker with a DIN rail mounting structure, such as an integrally molded recess sized to provide snap-on attachment to the DIN rail. Thus, in designs where the circuit breaker is coupled to the DIN rail, the entire DIN rail assembly must be moved to make available adjustments, if any, while in other designs, a separate stationary adapter is incorporated for securing the circuit breaker directly to the back panel of the enclosure and no adjustment is possible.

Accordingly, among the disadvantages of the aforementioned designs is the fact that they either do not permit the circuit breaker to be adjusted with respect to the back panel of the enclosure or with respect to the one or more bus bars in the enclosure assembly, or they require the entire DIN rail assembly to be moved in order to effectuate adjustment. This makes it difficult to install, exchange, remove, and/or adjust different circuit breakers within the enclosure. For example, it is often desirable to be able to mount a variety of different types of circuit breakers in the same panelboard, including IEC circuit breakers which are certified by the International Electrotechnical Commission, and NEMA circuit breakers which are certified by the National Electrical Manufacturers Association. Understandably, the shape and size of a given IEC circuit breaker are often different from those of the counterpart NEMA circuit breaker. Consequently, different mounting challenges are presented.

There is, therefore, room for improvement in adapters for mounting electrical switching apparatus, and in enclosure assemblies having adapters for mounting electrical switching apparatus.

SUMMARY OF THE INVENTION

These needs and others are met by the present invention, which is directed to an adjustable adapter for mounting and positioning electrical switching apparatus through use of an adjustment mechanism and a fastener in order to couple the adapter to the panel member when the fastener is fastened, while enabling adjustment of the adapter and the electrical switching apparatus coupled thereto, with respect to the panel member, when the fastener is unfastened.

As one aspect of the invention, an adapter is provided for mounting a number of electrical switching apparatus on a panel member having at least one aperture. The adapter comprises: a first end portion structured to be coupled at or about the aperture of the panel member; an engaging portion structured to engage and secure the electrical switching apparatus to the adapter; a fastener; and a second end portion disposed distal from the first end portion and including an adjustment mechanism. The adjustment mechanism is structured to receive the fastener in order to couple the adapter to the panel member when the fastener is fastened, while enabling adjustment of the adapter and the electrical switching apparatus coupled thereto, with respect to the panel member, when the fastener is unfastened.

The first end portion and the second end portion may form a generally horizontal plane and the engaging portion may comprise a plurality of resilient protrusions extending outwardly from the generally horizontal plane, wherein the resilient protrusions are structured to engage and secure the electrical switching apparatus. The electrical switching apparatus may be a circuit breaker including a molded housing having a base, a first end, and a second end, wherein each of the resilient protrusions includes a prong and is structured to bias the prong against the molded housing of the circuit breaker in order to secure the circuit breaker to the adapter. The resilient protrusions may include a first resilient protrusion disposed at or about the first end portion of the adapter, and a second resilient protrusion disposed proximate the second end portion of the adapter, wherein the first resilient protrusion includes a first prong structured to engage the first side of the molded housing and the second resilient protrusion includes a second prong structured to engage the second side of the molded housing. The base of the molded housing may include a recess having a first edge and a second edge, wherein the resilient protrusions include a pair of resilient protrusions disposed between the first and second end portions of the adapter, and wherein each of the resilient protrusions is structured to bias the prong thereof against a corresponding one of the first and second edges of the recess, in order to secure the circuit breaker to the adapter.

The first end portion of the adapter may include at least one tab structured to be inserted into the aperture of the panel member, the tab being adapted to slide with respect to the aperture in order to enable adjustment of the adapter when the fastener is loosened. The adjustment mechanism of the second end portion of the adapter may be an elongated slot, wherein the fastener is a threaded fastener which is received in the elongated slot and structured to be loosened and tightened in order to adjust and secure, respectively, the adapter and the electrical switching apparatus coupled thereto, with respect to the panel member.

The threaded fastener may be a screw and the first end portion, the engaging portion and the second end portion may form a single piece adapter, which may be a molded member.

As another aspect of the invention, an enclosure assembly comprises: an enclosure including a back panel having at least one aperture, first and second side walls extending from the back panel, a top end, and a bottom end; a bus bar housed by the enclosure; an electrical switching apparatus coupled to the bus bar; and an adjustable adapter comprising: a first end portion coupled at or about the aperture of the back panel, an engaging portion engaging and securing the electrical switching apparatus to the adjustable adapter, a fastener, and a second end portion disposed distal from the first end portion and including an adjustment mechanism. The adjustment mechanism receives the fastener in order to secure the adjustable adapter to the back panel when the fastener is fastened, and when the fastener is unfastened, the adjustable adapter and the electrical switching apparatus coupled thereto are adjustable with respect to the back panel and the bus bar.

The aperture of the back panel of the enclosure may be a slot and the first end portion of the adjustable adapter may include at least one tab wherein the tab is inserted into the slot and slides with respect to the slot in order to adjust the adjustable adapter with the electrical switching apparatus coupled thereto, when the fastener is loosened.

The electrical switching apparatus may be a single-pole circuit breaker having one pole with a load side and a line side. The slot of the back panel of the enclosure may be a single slot and the at least one tab of the first end portion of the adjustable adapter may be a single tab inserted into the single slot in order that the load side of the single-pole circuit breaker is brought into electrical communication with the bus bar. Alternatively, the electrical switching apparatus may be a multi-pole circuit breaker having a plurality of poles wherein each of the poles includes a load side and a line side, and the slot of the back panel of the enclosure may be a first slot wherein the back panel further comprises a second slot. Therefore, the tab of the first end portion of the adjustable adapter may comprise a first tab for insertion into the first slot, and a second tab for insertion into the second slot in order that the load side of each pole of the multi-pole circuit breaker is brought into electrical communication with the bus bar.

The enclosure may comprise a switchgear cabinet, and the electrical switching apparatus may comprise a circuit breaker selected from the group consisting of a NEMA circuit breaker and an IEC circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
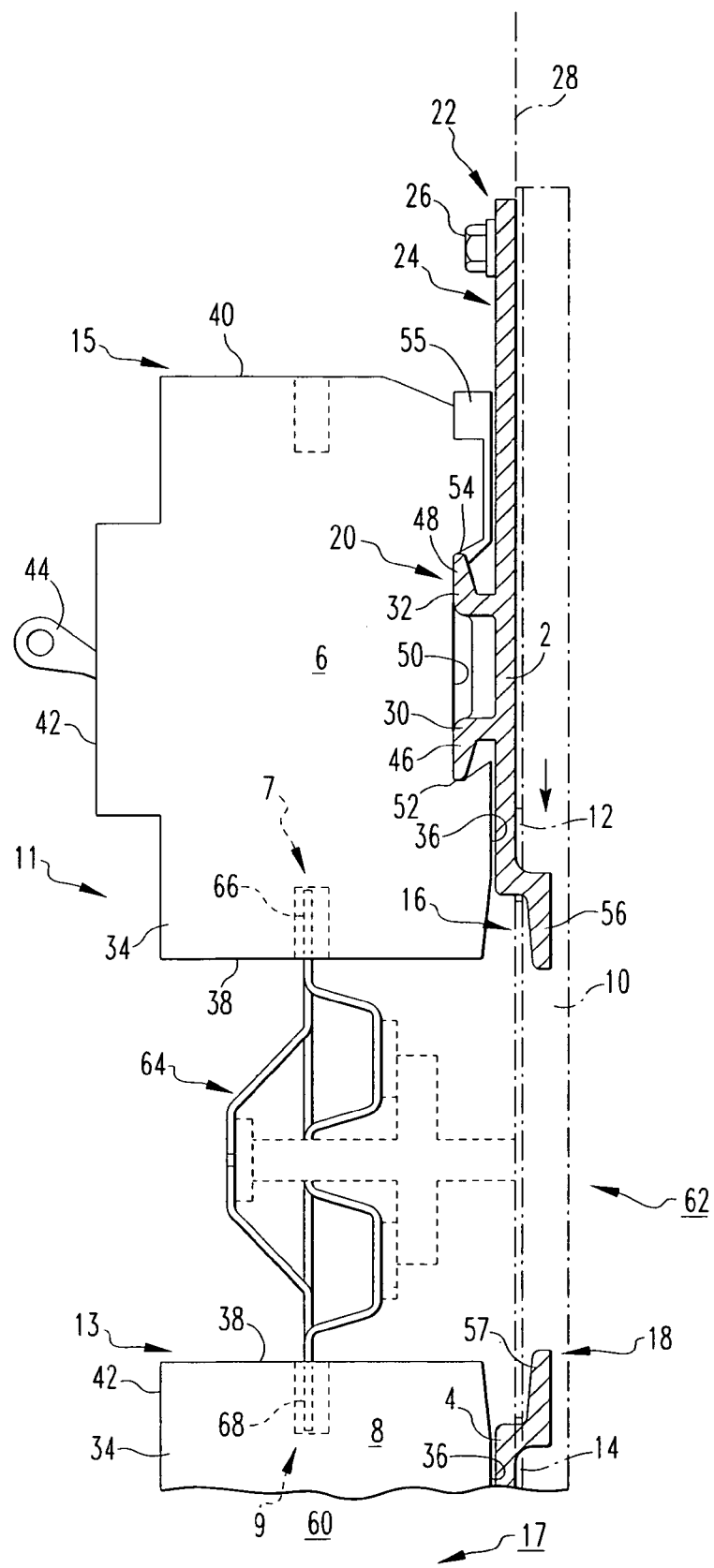
FIG. 1 is a side elevational view of an enclosure assembly including a single pole IEC circuit breaker and an adjustable adapter therefore, in accordance with the invention.

For purposes of illustration, the present invention will be described as applied to the mounting of electrical equipment (e.g., without limitation, relays; circuit breakers; electric meters; transformers) and, in particular, IEC and NEMA circuit breakers, within electrical enclosures (e.g., without limitation, panelboards; switchgear cabinets; load centers), although it will become apparent that it could also be applied to other types of circuit breakers and electrical switching apparatus, and to adjustable adapters for mounting such circuit breakers and electrical switching apparatus in applications other than within an enclosure (e.g., mounting to a generally flat panel member which is not part of an enclosure per se).

Directional phrases used herein, such as, for example and without limitation, top, bottom, upper, lower, front, back and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts, and the combinations of bolts and nuts (e.g., without limitation, lock nuts and wing nuts) and bolts, washers and nuts.

As employed herein, the statement that two or more parts are "coupled" together shall mean that the parts are joined together either directly or joined through one or more intermediate parts.

As employed herein, the term "number" shall mean one or more than one (i.e., a plurality).

As employed herein, the term "adjustment" refers to movement of one component with respect to another component to which it is coupled, and expressly includes, but is not limited to, translation of the components with respect to one another. For example, the adjustable adapter of the invention enables at least one circuit breaker to be adjusted (e.g., without limitation, translated) with respect to the enclosure in which it is mounted and with respect to the one or more bus bars and other switchgear therein.

As employed herein, the term "resilient" refers to the characteristic of a component wherein the component has a first, natural or undeflected position, and is deflectable to a second, deflected position. In the deflected position, the resilient component provides a bias (e.g., without limitation, a spring-like force) as it attempts to return to the natural or undeflected position. Once released from the deflected position, the resilient component returns to the undeflected position. In the undeflected position, no bias force is provided by the component.

FIG. 1 shows an adapter 2 for mounting a number of electrical switching apparatus 6 on a panel member 10 as part of an enclosure assembly 60 in accordance with the invention. In this example, the enclosure assembly 60 includes an enclosure 62 (e.g., without limitation, panelboard; switchgear cabinet; load center) (partially shown in phantom line drawing in FIG. 1) and the adapter 2 adjustably mounts to the panel member which in the example shown is the back panel 10 of enclosure 62.

More specifically, a pair of opposing single-pole IEC circuit breakers 6,8 (circuit breaker 8 is only partially shown in FIG. 1) are housed by the enclosure 62. Each circuit breaker 6,8 includes a molded housing 34 having a base 36, a first end 38, and a second end 40. The single-pole IEC circuit breakers 6,8 of FIG. 1 have a single pole 7,9 with a line side 11,13 and a load side 15,17. The line sides 11,13 of poles 7,9 oppose one another and are interconnected by a bus bar 64. As shown, the bus bar 64 includes a first stab 66 structured to engage circuit breaker 6 at pole 7, and a second stab 68 which is structured to engage circuit breaker 8 at pole 9. In this manner, electrical communication is achieved among the circuit breakers 6,8. Each circuit breaker 6 further includes a top 42 (oriented to the left with respect to FIG. 1) and an operating handle 44 extending therefrom.

As will be discussed herein, it will be appreciated that any known or suitable electrical switching apparatus, such as, for example and without limitation, NEMA certified circuit breaker (see, for example, multi-pole NEMA circuit breaker 206 and single-pole NEMA circuit breaker 306 of FIG. 4) having any known or suitable number of poles (see, for example, three-pole IEC circuit breaker 106 with ganged operating handle 144 of FIG. 2) could be employed with a corresponding adjustable adapter, in accordance with the invention.

Continuing to refer to FIG. 1, for simplicity of disclosure, only adapter 2 will be described in detail. Adapter 4, which is only partially shown, is essential identical, albeit disposed in the opposite direction with respect to the adapter. The adapter 2 includes a first end portion 16 structured to be coupled at or about an aperture 12 of back panel 10, an engaging portion 20 structured to engage and secure the circuit breaker 6 to the adapter 2, a fastener 26, and a second end portion 22 which is disposed distal from the first end portion 16. The second end portion 22 includes an adjustment mechanism 24 structured to receive the fastener 26, in order to couple the adapter 2 to the back panel 10 when the fastener 26 is fastened. The exemplary adjustment mechanism is an elongated slot 24, which enables adjustment of the adapter 2 and the circuit breaker 6 coupled thereto, with respect to back panel 10, when the fastener 26 is unfastened.

The exemplary fastener is a threaded fastener, such as a screw 26, which may be tightened and loosened, in order to secure and adjust, respectively, the adapter 2 and circuit breaker 6 coupled thereto. More specifically, the first end portion 16 includes at least one tab 56 (one tab 56,57 is shown for each adapter 2,4, respectively, in FIG. 1) structured to be inserted into the slot 12, 14 of panel member 10, and adapted to slide with respect thereto in order to enable such adjustment when the screw 26 is loosened. In this manner, not only may a circuit breaker such as the single-pole IEC circuit breaker 6 of FIG. 1 be readily installed, exchanged, removed, and/or adjusted with respect to back panel 10, but it may also be adjusted to optimize engagement and thus electrical communication with, for example, stab 66 of bus bar 64.

The base 36 of the molded housing 34 of single-pole IEC circuit breaker 6 in the example of FIG. 1 further includes a recess 50 having a first edge 52 and a second edge 54. The engagement portion 20 of adapter 2 includes a pair of resilient protrusions 30, 32 extending outwardly from the generally horizontal plane 28 formed by first end portion 16 and second end portion 22. More specifically, each of the resilient protrusions 30, 32 is structured to bias a prong 46, 48 disposed on the end thereof, against a corresponding one of the first and second edges 52, 54 of recess 50, in order to secure the circuit breaker 6 to the adapter 2. In other words, prongs 46, 48 deflect downward and upward (with respect to FIG. 1) against edge 52 and edge 54, respectively, thereby securely coupling circuit breaker 6 to the adapter 2. As shown in the example of FIG. 1, the circuit breaker 6 may optionally include a spring slider mechanism 55 (shown in simplified form in FIG. 1). Such spring slider mechanisms 55 are generally well known in the art as disclosed, for example, in U.S. Pat. No. 6,292,076, which is hereby incorporated herein by reference. In accordance with the invention, the spring slider mechanism 55 would engage at least one of prongs 46, 48 in order to further secure the circuit breaker 6.

Figure 2:
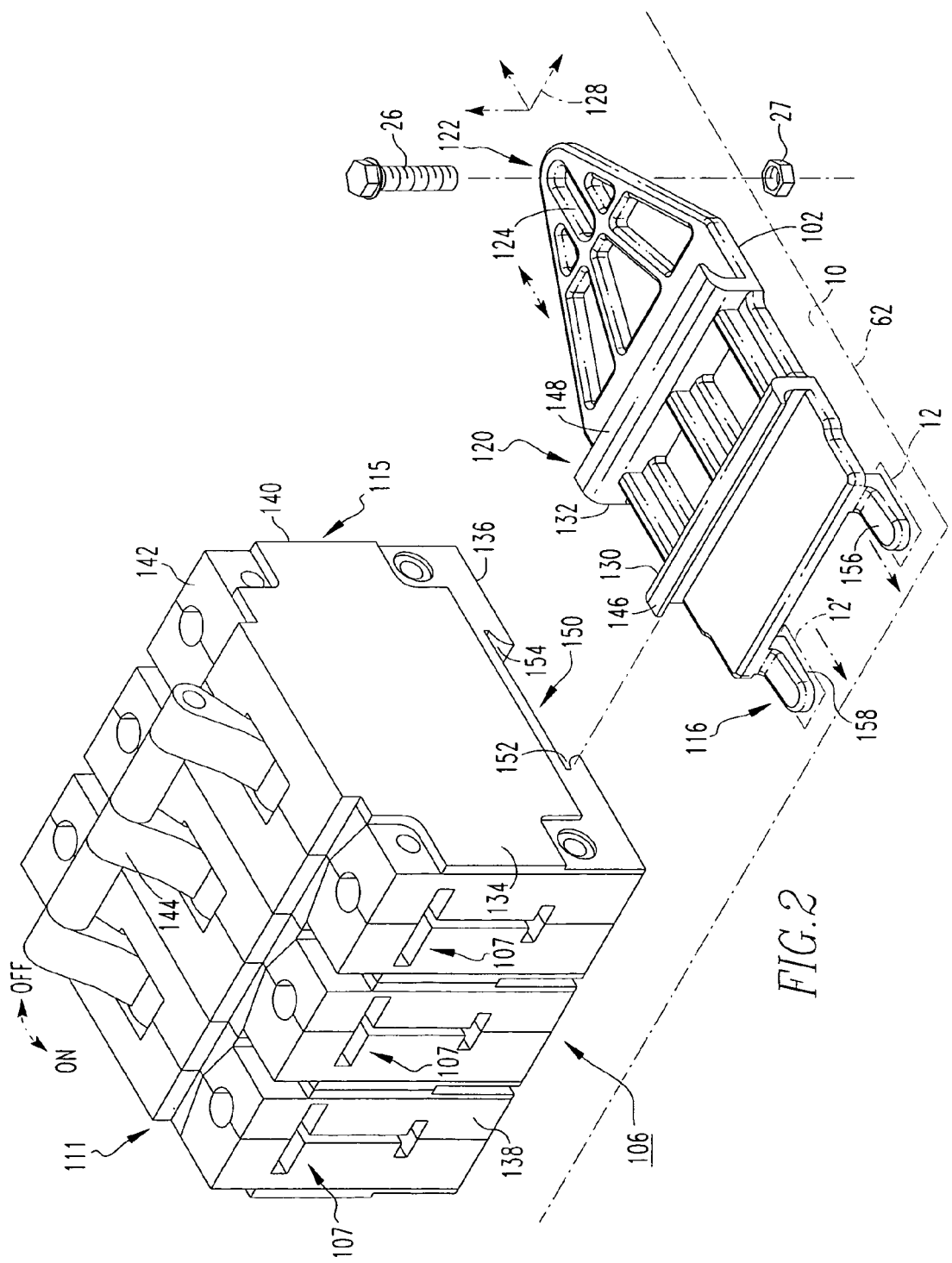
FIG. 2 is an exploded isometric view of a multi-pole IEC circuit breaker and an adjustable adapter therefor, in accordance with an embodiment of the invention.

FIG. 2 shows an adapter 102 for mounting a multi-pole IEC circuit breaker, such as the three-pole IEC circuit breaker 106 shown, to the back panel 10 of enclosure 62. The engagement portion 120 of adapter 102 includes a pair of resilient protrusions 130,132 each having a prong 146,148 for engaging the first and second edges 152,154, respectively, of the recess 150 in base 136 of the circuit breaker molded housing 134, in substantially the same manner as engagement portion 20 of adapter 2 previously discussed in connection with FIG. 1. In the example of FIG. 2, the circuit breaker 106 has three poles 107 each including a line end 111 and a load end 115. Although the operating handle 144, which protrudes from top 142 of the molded housing 134 is shown as comprising three separate operating handles ganged together to form a single ganged operating handle 144, it will be appreciated that any known or suitable number of operating handles and any number of circuit breaker poles could be employed in any suitable configuration. Accordingly, it will be understood that the adapter (e.g., 102) in accordance with the invention is not only adjustable, but it is also capable of readily accommodating a wide variety of commercially available electrical switching apparatus both including, and in addition to, the circuit breakers shown and described herein.

In the example of FIG. 2, the first end portion 116 of adapter 102 includes a first tab 156 inserted into first slot 12 of back panel 10 (shown in phantom line drawing) and a second tab 158 inserted into second slot 12'. The tabs 156,158 are moveable with respect to slots 12,12', respectively, in order to provide adjustment, as previously described. At the second end portion 122 of adapter 102, the adjustment mechanism, which comprises an elongated slot 124, is provided. The exemplary threaded fastener 26 is received through the elongated slot 124 in order to couple the adapter 102 to the back panel 10. In this example, a nut 27 secures the assembly together although it will be appreciated that a nut is not required. In operation, when the example fastener 26,27 is loosened, adapter 102 is adjustable by way of slot 124 and the aforementioned tabs 156,158 and slots 12,12'. It will, however, be appreciated that any known or suitable adjustment mechanism (not shown) other than the exemplary elongated slot 124 could be employed with or without any number of suitable alternative fasteners (not shown). It will further be appreciated that any suitable adjustment configuration could be employed at the first end portion 116 other than the exemplary first and second tab 156,158 and slot 12,12' arrangement. For example, and without limitation, a single tab and slot combination (not shown) or any combination of more than two tabs and slots (not shown), could be employed.

It will still further be appreciated that although the adapter embodiments shown and described herein are contemplated as being made from a single piece molded member, such as, for example and without limitation, plastic, and that the first end portion, engaging portion, and second end portion, are contemplated as forming the adapter as a single-piece, the adapter could be made from any known or suitable material other than plastic, and/or from two or more separate components without departing from the scope of the invention.

Figure 3:
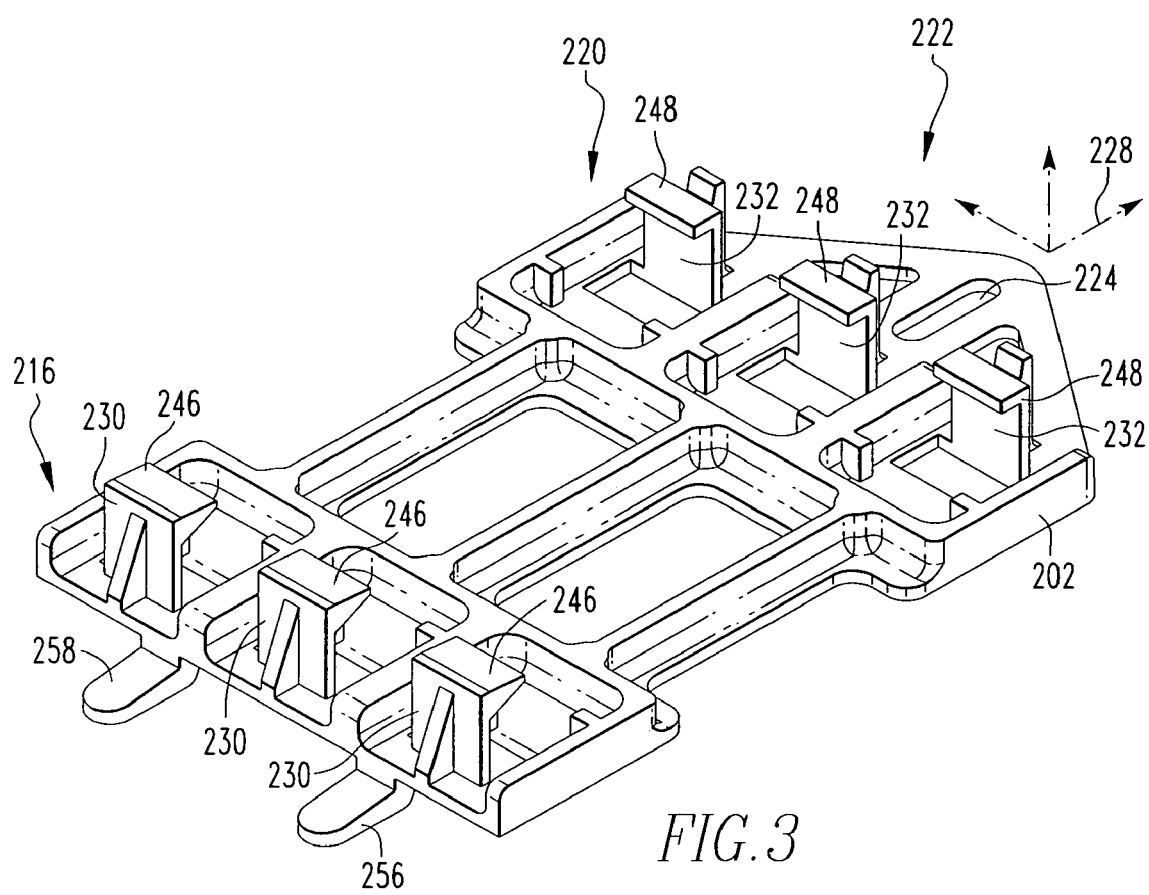
FIG. 3 is an isometric view of an adjustable adapter for mounting a three-pole NEMA circuit breaker in accordance with another embodiment of the invention.
Figure 4:
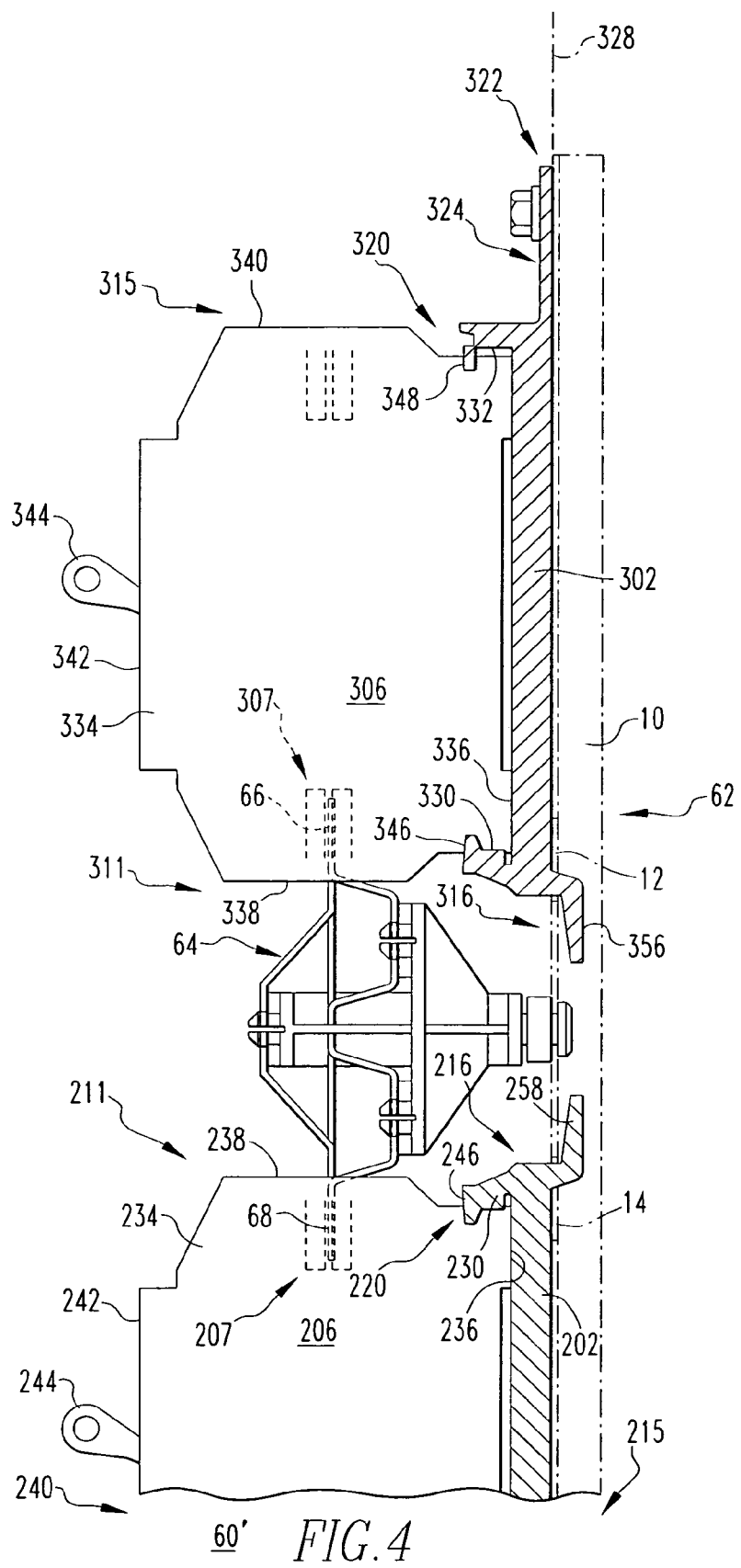
FIG. 4 is a side elevational view of an enclosure assembly including a multi-pole NEMA circuit breaker and the adjustable adapter of FIG. 3, and a portion of a single-pole NEMA circuit breaker and adjustable adapter therefor.

FIGS. 3 and 4 show two other example adjustable adapters 202, 302 (FIG. 4) in accordance with the invention. Adapter 202 (shown in its entirety in FIG. 3, and partially shown in FIG. 4), like adapters 2,4, and 102, previously discussed, includes a first end portion 216, an engaging portion 220, and a second end portion 222, all of which form a generally horizontal plane 228. However, adapter 202 and adapter 302 (FIG. 4) are structured to mount NEMA circuit breakers (see, for example, three-pole NEMA circuit breaker 206 and single-pole NEMA circuit breaker 306 of FIG. 4). Accordingly, unlike the generally centrally disposed resilient protrusions 130,132 of, for example, adapter 102 of FIG. 2, adapters 202 and 302 include a first resilient protrusion 230 and 330, respectively, which is disposed at or about the first end portion 216,316 of the adapter 202,302, and a second resilient protrusion 232,332 which is disposed proximate the second end portion 222,322 of the adapter 202,302.

In the example of FIG. 3, adapter 202 is designed to engage and secure three-pole NEMA circuit breaker 206 (FIG. 4) and, therefore, includes three first resilient protrusions 230 and three second resilient protrusions 232. Each first resilient protrusion 230 includes a first prong 246 for engaging the first side 238 of molded housing 234 of the circuit breaker 206, as shown in FIG. 4. Likewise, the second resilient protrusion 232 includes a second prong 248. For simplicity of illustration, second end 240 of the circuit breaker molded housing 234 is not shown in its entirety in FIG. 4. However, it will be understood that each of the three prongs 248 proximate the second end portion 222 of the adjustable adapter 202 would engage the second end (generally indicated by reference number 240 in FIG. 4) of the circuit breaker 206 (FIG. 4) in substantially the same manner that second prong 348 of second resilient member 332 on adapter 302 engages the second end 340 of single-pole NEMA circuit breaker 306 in FIG. 4.

FIG. 4 shows a combination of a single-pole NEMA circuit breaker 306, shown in its entirety, and the first end portion of the three-pole NEMA circuit breaker 206. Hence, the example of FIG. 4 demonstrates how adjustable adapters (e.g., 202,302) in accordance with the invention, can be used to adjustably mount a wide variety of electrical switching apparatus (e.g., three-pole NEMA circuit breaker 206 and single-pole NEMA circuit breaker 306) within an enclosure assembly 60'. More specifically, in operation, a wide variety of different circuit breaker types (e.g., without limitation, IEC; NEMA) and sizes (e.g., without limitation, single-pole; multi-pole) can be readily inserted and adjusted, for example, for an optimized installation within enclosure 62. It will, therefore, be appreciated that any known or suitable combination of such electrical switching apparatus and corresponding adapters therefor, could be employed within the scope of the invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An adapter for mounting a number of electrical switching apparatus on a panel member, said panel member having at least one aperture, said at least one aperture extending through said panel member, said adapter comprising:
   a first end portion structured to extend through said at least one aperture of said panel member;
   an engaging portion structured to engage and secure said electrical switching apparatus to said adapter;
   a fastener; and
   wherein said first end portion includes at least one tab structured to be inserted into said at least one aperture of said panel member, said at least one tab being adapted to slide with respect to said aperture in order to enable adjustment of said adapter when said fastener is loosened;
   a second end portion disposed distal from said first end portion and including an adjustment mechanism, said adjustment mechanism being structured to receive said fastener in order to couple said adapter to said panel member when said fastener is fastened, while enabling adjustment of said adapter and said electrical switching apparatus coupled thereto, with respect to said panel member, when said fastener is unfastened.

2. The adapter of claim 1 wherein said first end portion and said second end portion form a generally horizontal plane; wherein said engaging portion comprises a plurality of resilient protrusions extending outwardly from said generally horizontal plane; and wherein said resilient protrusions are structured to engage and secure said electrical switching apparatus.

3. The adapter of claim 2 wherein said electrical switching apparatus is a circuit breaker including a molded housing having a base, a first end, and a second end; and wherein each of said resilient protrusions includes a prong and is structured to bias said prong against said molded housing of said circuit breaker in order to secure said circuit breaker to said adapter.

4. The adapter of claim 3 wherein said resilient protrusions include a first resilient protrusion disposed at or about the first end portion of said adapter, and a second resilient protrusion disposed proximate the second end portion of said adapter; wherein said first resilient protrusion includes a first prong structured to engage the first side of said molded housing of said circuit breaker; and wherein said second resilient protrusion includes a second prong structured to engage the second side of said molded housing.

5. The adapter of claim 3 wherein said base of said molded housing of said circuit breaker includes a recess having a first edge and a second edge; wherein said resilient protrusions include a pair of resilient protrusions disposed between the first and second end portions of said adapter; and wherein each of said resilient protrusions is structured to bias said prong thereof against a corresponding one of said first and second edges of said recess, in order to secure said circuit breaker to said adapter.

6. The adapter of claim 1 wherein said adjustment mechanism of said second end portion of said adapter is an elongated slot; and wherein said fastener is a threaded fastener which is received in said elongated slot and structured to be loosened and tightened in order to adjust and secure, respectively, said adapter and said electrical switching apparatus coupled thereto, with respect to said panel member.

7. The adapter of claim 6 wherein said threaded fastener is a screw.

8. The adapter of claim 1 wherein said adapter is one single piece of material: and wherein said first end portion, said engaging portion and said second end portion comprise different segments of said one single piece of material.

9. An enclosure assembly comprising:
   an enclosure including a back panel having at least one aperture extending therethrough;
   a bus bar housed by said enclosure;
   an electrical switching apparatus coupled to said bus bar; and
   an adjustable adapter comprising:
      a first end portion extending through said at least one aperture of said back panel, an engaging portion engaging and securing said electrical switching apparatus to said adjustable adapter,
a fastener, and
wherein said first end portion includes at least one tab structured to be inserted into said at least one aperture of said panel member, said at least one tab being adapted to slide with respect to said aperture in order to enable adjustment of said adapter when said fastener is loosened;
a second end portion disposed distal from said first end portion and including an adjustment mechanism, said adjustment mechanism receiving said fastener in order to secure said adjustable adapter to said back panel when said fastener is fastened,
wherein, when said fastener is unfastened, said adjustable adapter and said electrical switching apparatus coupled thereto are adjustable with respect to said back panel and said bus bar.

10. The enclosure assembly of claim 9 wherein said first end portion and said second end portion form a generally horizontal plane; wherein said engaging portion comprises a plurality of resilient protrusions extending outwardly from said generally horizontal plane; and wherein said resilient protrusions engage and secure said electrical switching apparatus.

11. The enclosure assembly of claim 10 wherein said electrical switching apparatus is a circuit breaker including a molded housing having a base, a first end, and a second end; and wherein each of said resilient protrusions includes a prong and biases said prong against said molded housing of said circuit breaker in order to secure said circuit breaker to said adjustable adapter.

12. The enclosure assembly of claim 11 wherein said resilient protrusions include a first resilient protrusion disposed at or about the first end portion of said adjustable adapter and a second resilient protrusion disposed proximate the second end portion of said adjustable adapter; wherein said first resilient protrusion includes a first prong which engages the first side of said molded housing of said circuit breaker; and wherein said second resilient protrusion includes a second prong which engages the second side of said molded housing.

13. The enclosure assembly of claim 11 wherein the base of said molded housing of said circuit breaker includes a recess having a first edge and a second edge; wherein said resilient protrusions include a pair of resilient protrusions disposed between the first and second end portions of said adjustable adapter; and wherein each of said resilient protrusions biases said prong thereof against a corresponding one of said first and second edges of said recess, in order to secure said circuit breaker to said adjustable adapter.

14. The enclosure assembly of claim 11 wherein said electrical switching apparatus is a single-pole circuit breaker having one pole with a line side and a load side; wherein said slot of said back panel of said enclosure is a single slot; and wherein said at least one tab of said first end portion of said adjustable adapter is a single tab inserted into said single slot in order that said line side of said single-pole circuit breaker is brought into electrical communication with said bus bar.

15. The enclosure assembly of claim 11 wherein said electrical switching apparatus is a multi-pole circuit breaker having a plurality of poles; wherein each of said poles includes a line side and a load side; wherein said slot of said back panel of said enclosure is a first slot; wherein said back panel further comprises a second slot; and wherein said at least one tab of said first end portion of said adjustable adapter comprises a first tab for insertion into said first slot, and a second tab for insertion into said second slot in order that said line side of each pole of said multi-pole circuit breaker is brought into electrical communication with said bus bar.

16. The enclosure assembly of claim 9 wherein said adapter comprises one single piece of material; and wherein said first end portion, said engaging portion, and said second end portion comprise different segments of said one single piece of material.

17. The enclosure assembly of claim 9 wherein said enclosure comprises a switchgear cabinet; and wherein said electrical switching apparatus comprises a circuit breaker selected from the group consisting of a NEMA circuit breaker and an IEC circuit breaker.

18. The adapter of claim 1 wherein said at least one aperture of said panel member is a first slot and a second slot; wherein said first end portion of said adapter comprises a first tab and a second tab; and wherein said first tab is structured to extend through said first slot and to be slidable with respect to said first slot, and said second tab is structured to extend through said second slot and to be slidable with respect to said second slot, in order that said adapter is structured to be adjustable with respect to said panel member.

* * * * *